Patented Jan. 28, 1941

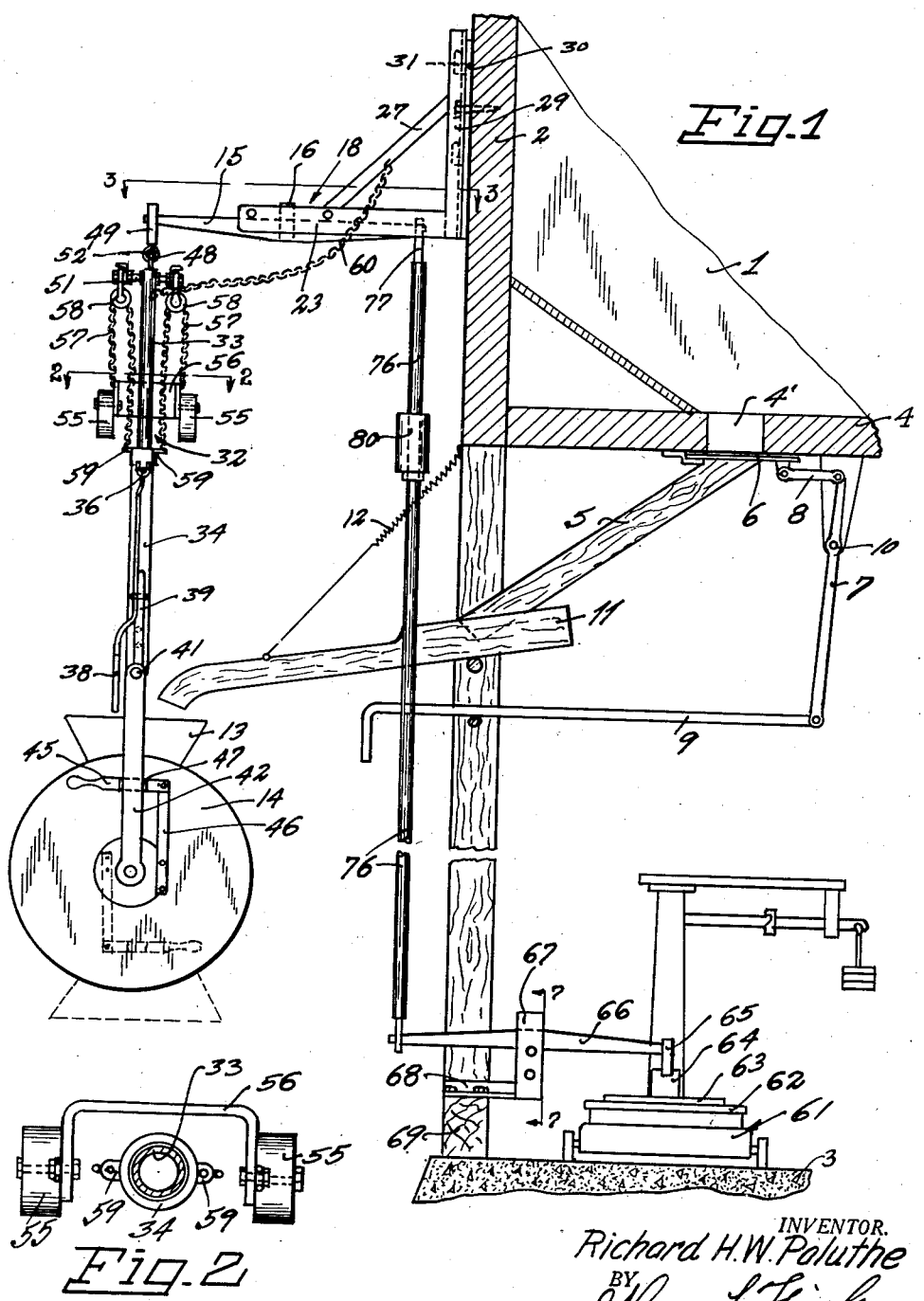

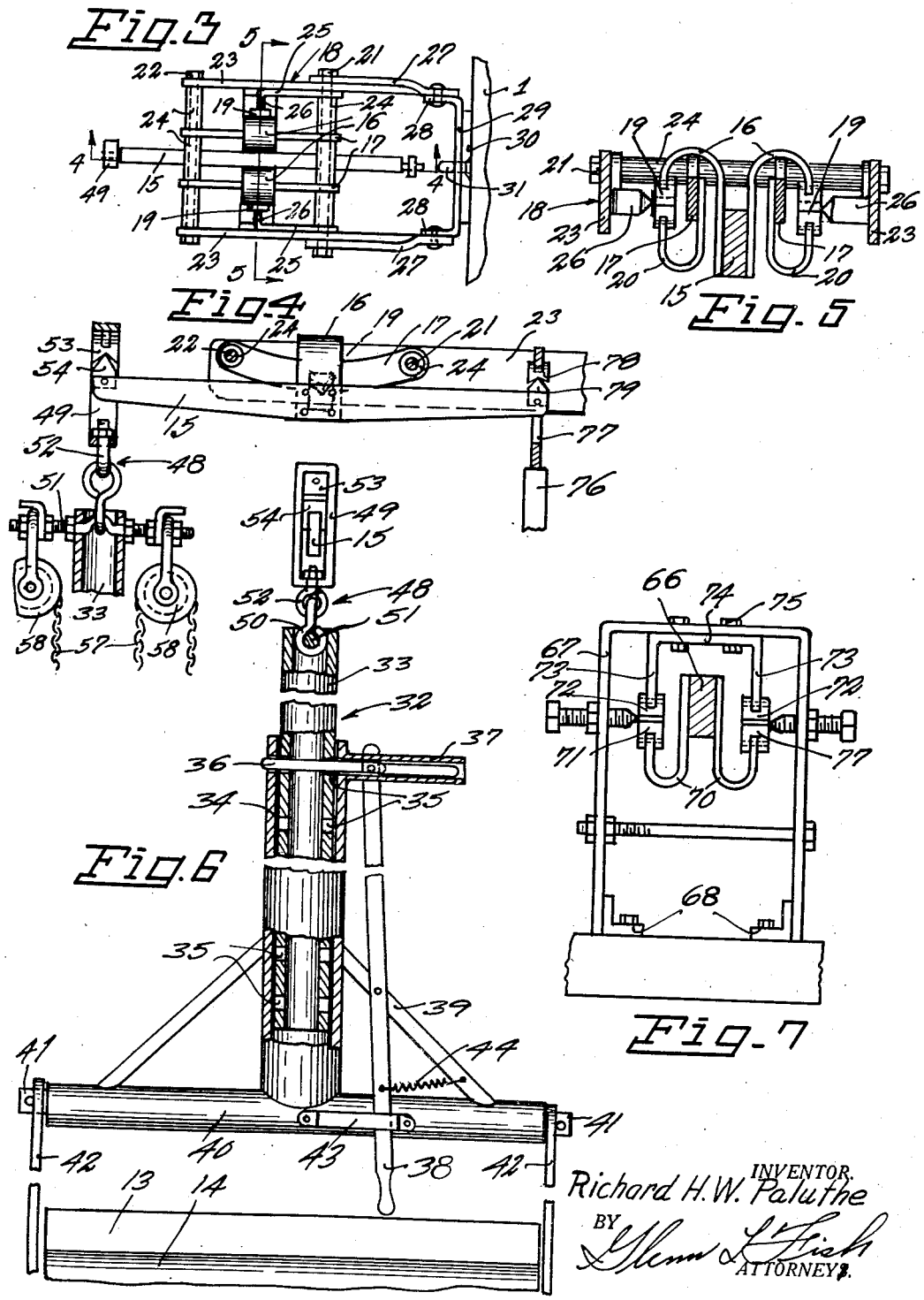

2,229,670

UNITED STATES PATENT OFFICE 2,229,670

GRAIN WEIGHING APPARATUS

Richard H. W. Paluthe, Moscow, Idaho

Application October 14, 1939, Serial No. 299,481

8 Claims. (Cl. 265—27)

This invention relates to a grain weighing apparatus and it is one object of the invention to provide an apparatus by means of which grain delivered from a bin for transportation to a grain elevator or other destination, may be weighed before being deposited in a wagon or other vehicle in which it is to be transported. It will thus be seen that a farmer sending grain to market may weigh the same as it is delivered from a bin into a wagon and have his own record of the quantity shipped instead of having to depend upon figures forwarded him by the commission agent or the operator of a grain elevator to whom the grain is sent.

Another object of the invention is to provide a weighing apparatus wherein the grain is discharged from a bin into a container suspended from a beam operatively associated with a scale by means of which the grain in the container is weighed, the container being so mounted that it may be turned from a filling position to an inverted position in which grain may pass from the container into a vehicle under the container.

Another object of the invention is to so mount the container that it may be vertically adjusted and thus disposed at such a height from the ground that a wagon, truck, or other vehicle may be driven into and out of place beneath the container.

Another object of the invention is to permit the hanger for the container to be swung longitudinally and transversely of the vehicle body and thus permit the grain to be distributed in the vehicle as it is delivered thereto.

Another object of the invention is to provide weighing apparatus wherein the container is suspended from an overhead beam connected with a lower beam in operative relation to a scale which may be located in the lower portion of a barn in such position that it will be readily accessible and sheltered from exposure to the weather.

The invention is illustrated in the accompanying drawings, wherein:

Fig. 1 is a view showing the grain weighing apparatus in elevation and in operative relation to a grain bin occupying a portion of a barn or other building.

Fig. 2 is a fragmentary sectional view taken transversely through the container suspending mechanism on the line 2—2 of Fig. 1.

Fig. 3 is a view taken on the line 3—3 of Fig. 1.

Fig. 4 is a sectional view on the line 4—4 of Fig. 3.

Fig. 5 is a transverse sectional view on the line 5—5 of Fig. 3.

Fig. 6 is a view looking from the left of Fig. 1, showing the container and its suspending means partially in elevation and partially in vertical section.

Fig. 7 is a fragmentary view on the line 7—7 of Fig. 1.

The grain which is to be weighed is stored in a bin 1 occupying an elevated position in a barn or other building having a wall 2 and a floor 3. The bottom 4 of the bin is formed with an outlet opening 4' from which a spout 5 extends and, in order to control the flow of grain through the spout, there has been provided a gate 6 connected with the upper end of a rocker arm or lever 7 by a link 8. To the lower end of the lever 7 is pivoted one end of a handle 9 which extends outwardly from the wall 2 to such position that its outer end may be conveniently grasped and the handle shifted longitudinally to rock the lever about its pivot 10 and move the gate into and out of closed position. A trough or chute 11 is tiltably mounted under the outer end of the spout 5 and is yieldably held against downward tilting movement by a spring 12. It will thus be seen that the chute 11 may be swung downwardly to a position in which grain will flow freely through the same in to the mouth 13 of the container 14 and returned to a raised position after the container has been filled.

The container is suspended from an upper scale beam 15 mounted between yokes or hangers 16 which straddle the inner bars 17 of a frame 18 and, at their upper ends, carry bearing blocks 19 which rest upon the outer upturned ends of brackets 20 carried by the bars 17 in depending relation thereto at opposite sides of the beam 15. The bars 17 extend longitudinally of the frame 18 with their inner and outer ends mounted on rods or bolts 21 and 22 extending transversely of the frame and, at their ends, passing through the outer side bars 23 of the frame. Spacing sleeves 24 hold the bars 17 in their proper positions between the side bars 23 and, in order to hold the bearing blocks 19 in their proper engagement with the upturned ends of the brackets 20, there have been provided strips 25 extending along inner side faces of the side bars 23 and having their forward end portions bent inwardly to form arms 26 which abut the blocks 19. Bracing bars 27 extend longitudinally of rear portions of the side bars 23 and have their rear ends secured to the forwardly projecting flanges 28 of a head member or plate 29 which is mounted against a backing plate 30 by means of hooks 31. Rear ends of the side bars 23 are welded or otherwise secured to the flanges of the head member and since the frame is braced by the bracing strips 27, it will be maintained in a horizontal position and extend horizontally from the wall 2 of the building.

In order to suspend the container 14 from the upper scale beam 15, there has been provided a hanger shaft or bar 32 consisting of upper and lower tubular sections 33 and 34, the upper section being snugly received in the lower section in telescoping relation thereto and formed with sets of opposed openings 35 to receive the securing pin 36 slidably mounted in the tubular arm 37 projecting laterally from the upper portion of the lower section. An operating handle 38 is provided for the securing pin and pivoted to one of the braces 39 which extend between the lower section 34 and end portions of the cross head 40. This tubular cross head carries an axle 41 having its end portions projecting from opposite ends of the cross head and carrying hangers 42 between the lower ends of which the container is tiltably mounted. The cross head also carries a guide 43 for the lower portion of the handle 38 and, in order to yieldably hold the handle in its normal position with the pin engaged through openings of the upper section 33, there has been provided a spring 44 secured at its ends to the handle and one of the braces 39. In order to hold the container in its upright position until it is to be dumped, there has been provided a latch 45 formed of a strip of resilient metal. This latch extends laterally from the upper end of a supporting strip 46 carried by one end wall of the container and intermediate its length is bent to form an offset seat 47 to receive the hanger 42, across which it extends. Under normal conditions the hanger is engaged in the seat and maintains the container in upright position. When it is desired to dump grain from the container, the free end of the latch is grasped and the latch sprung out of engagement with the hanger, thereby releasing the container and permitting it to be turned to inverted dumping position as indicated by dotted lines in Fig. 1. Grain will then flow from the container into a wagon or other vehicle under the container. A shackle 48 connects the hanger bar 32 with the loop 49 and consists of a lower link 50 loosely engaged about a pin or rod 51 carried by the upper section 33 of the hanger bar and an upper link or eye bolt 52 mounted through the lower end of the loop. This loop fits about the front end of the scale beam 15 and carries a saddle 53 resting on the pivot block 54 at the front end of the scale beam. By suspending the hanger bar from the scale beam in the manner set forth, and illustrated in Figs. 1 and 4 of the drawings, the hanger may be swung longitudinally or transversely of a wagon or other vehicle and the grain distributed in the wagon as it is dumped from the container.

When the latch 36 is withdrawn from the openings of the upper section 33 of the hanger 32, it is desired to permit the container and the lower section 34 to be easily shifted vertically to a position in which a vehicle may be driven under the container, the container being disposed at such an elevation that the grain will flow from the trough 11 into the mouth of the container without danger of spilling. In order to effect easy vertical shifting of the container, there have been provided counterweights 55 which are mounted at opposite ends of a yoke 56 having chains 57 secured to the same. These chains are trained about pulleys 58 mounted at opposite ends of the rod 51 which has its end portions projecting from opposite sides of the upper section 33 of the hanger 32 and from these pulleys the inner flights of the chains extend downwardly with their ends secured to ears 59 projecting from opposite sides of the section 34. The weight of the container will, therefore, be counterbalanced and the container may be easily shifted vertically with the latch 36 drawn outwardly to its inoperative position. When the container is in approximately the desired position, the handle 38 is released and the spring 44 will contract to move the latch inwardly and cause it to pass through openings 35 of the inner section as soon as the adjacent openings 35 are in alinement with the latching pin. A safety chain 60 prevents the container from dropping upon the ground if the loop 49 should slip from the beam 15.

Within the barn or building is disposed a scale 61 which rests upon the floor 3 as shown in Figure 1. Upon the platform 62 of the scale rests a plate 63 having an upstanding shank 64 carrying a loop 65 which is pivoted to the inner end of a lower scale beam 66. This scale beam extends horizontally through a frame 67 carried by bars 68 extending inwardly from the bolster 69 of the wall 2. Arms 70 formed from metal strips are secured vertically against side faces of the inner end of the beam 66 and have their lower portions bent outwardly and upwardly and mounted in pivot blocks 71. The upper receiving blocks 72 are mounted at the lower ends of the arms 73 of a yoke 74 which is secured to the bridge of the frame 67 by bolts 75. By this arrangement, the lower scale beam will be mounted for rocking movement and since the inner end of the beam is pivoted to the plate 64, upward movement of the outer end of the beam 66 will cause pressure to be applied to the platform of the scale and the scale operated the same as if a load to be weighed were placed on the scale platform. The outer end of the lower scale beam 66 is connected with the inner end of the upper scale beam 15 by a rod or link 76 extending vertically with its lower end engaged with the lower scale beam and its upper end provided with a loop 77 engaged about the upper scale beam and carrying a saddle 78 which rests upon a pivot block 79 rising from the inner end of the upper scale beam. A counterweight 80 is provided upon the rod as a counterbalance.

When the weighing apparatus is in use, it is erected as shown in Fig. 1, and when the container is empty the balance of parts is such that no weight is registered by the scale. The container is shifted vertically to a position in which a truck or other vehicle may be driven into place under the container and grain flows into the container through the spout or trough 11 when the gate 6 is moved to open position. When the container is filled the gate 6 is closed and the latch 45 moved to releasing position. The container is then turned to inverted position and the grain will flow from the container into the truck. Before the container is released and moved to its inverted position for dumping, the scale is operated to ascertain the weight of grain in the container. This weight is made note of and after the vehicle body has been filled by filling and dumping the container a number of times, the notations of the weights which have been made are added to ascertain the total weight of grain in the vehicle body. The shipper sending grain to a grain elevator, commission merchant, or other destination, may thus have a record of the weight of grain forwarded by him as a check on the quantity shown upon the receipt received from the person or firm to whom it is delivered. By mounting the hanger 32 for swinging movement it is very easy to distribute the grain as it pours from the container into the vehicle.

Having thus described the invention, what is claimed is:

1. In combination with a structure including a wall, a storage chamber enclosed in said structure in an elevated position, and a discharge spout for receiving material from said chamber extending outwardly through the wall; a scale in said structure, a lower scale beam pivotally mounted and extending through said wall with its inner end in operative engagement with the scale, a support carried by said wall in an elevated position externally of the structure, an upper scale beam pivoted to said support laterally of the wall, a link connecting the inner end of the upper scale beam with the outer end of the lower scale beam, a hanger suspended from the outer end of the upper scale beam, and a container carried by said hanger and adapted to have its contents dumped therefrom.

2. In combination with a structure including a wall, a storage chamber enclosed in said structure in an elevated position, and a discharge spout for receiving material from said chamber extending outwardly through the wall; a scale in said structure, a fulcrum carried by said wall and extending inwardly therefrom, a lower scale beam pivotally carried by said fulcrum and extending laterally of the wall with its inner end operatively associated with the scale and its outer portion passing through the wall and projecting outwardly therefrom, a frame extending outwardly from the wall and having an upstanding head at its inner end, a mounting for said frame secured against the outer face of the wall and having hooks engaging the head of the frame, an upper scale beam pivotally carried by the frame and extending from the wall laterally thereof, a link connecting the inner end of the upper scale beam with the outer end of the lower scale beam, a hanger suspended from the outer end of the upper scale beam, and a container carried by said hanger and mounted for movement from a filling position to a dumping position.

3. In a weighing apparatus, a frame, means for mounting said frame in elevated position, an upper scale beam pivotally carried by said frame, a scale, a lower scale beam, a frame pivotally mounting the lower scale beam with one end in cooperating relation to the scale, a link connecting the other end of the lower scale beam with one end of the upper scale beam, a hanger having upper and lower sections in telescoping relation to each other, the upper section being suspended from the upper scale beam, a counterweight for the lower section, means for releasably securing the lower section in vertically adjusted position, a container carried by the lower section and mounted for turning movement from upright position to inverted position for dumping, and latch means for securing the container in upright position.

4. In a weighing apparatus, a frame, means for mounting said frame in elevated position, an upper scale beam pivotally carried by said frame, a scale, a lower scale beam, a frame pivotally mounting the lower scale beam with one end in cooperating relation to the scale, a link connecting the other end of the lower scale beam with one end of the upper scale beam, a hanger having upper and lower sections, the upper sections being suspended from the upper scale beam and the lower section being shiftable vertically to adjusted position relative to the upper section, pulleys carried by the upper section at opposite sides thereof, counterweight means consisting of a yoke disposed horizontally and weights carried by the yoke in spaced relation to opposite sides of the hanger, chains trained about said pulleys with their ends secured to the yoke and the upper end of the lower section, a container suspended from the lower section and mounted for turning movement from an upright position to an inverted dumping position, and latch means for releasably securing the container in upright position.

5. In a weighing apparatus, a frame adapted to be mounted in elevated position, a scale beam pivoted to said frame, a scale, an operating connection between the scale beam and said scale, a hanger having an upper section and a lower section shiftable vertically relative to the upper section, the upper section being suspended from said scale beam, a securing pin slidably mounted transversely of the lower section and engageable through the upper section to secure the lower section in adjusted position, a container suspended from the lower section and mounted for turning movement from upright position to inverted dumping position, latch means for securing said container in its upright position, and counterweight means carried by the upper section and connected with the lower section.

6. In a weighing apparatus, a frame adapted to be mounted in elevated position, a scale beam pivoted to said frame, a scale, an operating connection between the scale beam and said scale, a hanger having an upper section and a lower section shiftable vertically relative to the upper section, the upper section being suspended from said scale beam, means for releasably securing the lower section in vertically adjusted position, a counterweight carried by the upper section and connected with the lower section, a crosshead at the lower end of the lower section, an axle passing through said crosshead with its ends projecting from opposite ends thereof, arms suspended from ends of said axle, a container between said arms rotatably mounted between lower ends thereof for turning movement from upright position to inverted dumping position, and a latch carried by said container for engaging one arm and securing the container in its upright position.

7. In a weighing apparatus, a frame adapted to be mounted in an elevated position, a scale beam pivoted to said frame, a scale, an operating connection between the scale beam and said scale, a hanger having an upper section and a lower section shiftable vertically relative to the upper section, means for releasably securing the lower section in vertically adjusted position, a rod extending transversely through the upper section, a loop engaging about said scale beam, links connecting said loop with the rod, pulleys carried by said rod in spaced relation to opposite sides of said upper section, a U-shaped yoke disposed horizontally in straddling relation to said hanger, weights carried by arms of said yoke, chains trained about said pulleys and extending downwardly therefrom with their ends secured to arms of the yoke and opposite sides of the upper end of the lower section, a container suspended from the lower section and mounted for turning movement from an upright position to inverted dumping position, and means for releasably securing the container upright.

8. In a weighing apparatus, a frame having side bars, inner bars extending longitudinally of the frame and spaced from the side bars and each other, cross rods carried by the side bars for supporting ends of the inner bars, brackets carried by said inner bars, a scale beam extending longitudinally in said frame between the inner bars, yokes extending upwardly from opposite sides of said scale beam with their upper portions extending laterally over the inner bars and downwardly over said brackets, bearing blocks between the yokes and brackets mounting the scale beam for tilting movement, a head member extending upwardly from the inner end of the side bars for engagement with a support, bracing bars between the head member and said side bars, a hanger bar suspended from the outer end of said scale beam, a container carried by said hanger bar and movable from upright position to inverted dumping position, and means for releasably securing the container in its upright position.

RICHARD H. W. PALUTHE.